(12) United States Patent
Li et al.

(10) Patent No.: US 11,815,151 B2
(45) Date of Patent: Nov. 14, 2023

(54) VIBRATION CONTROL DEVICE INTEGRATING PASSIVE CONTROL, SEMI-ACTIVE CONTROL AND ACTIVE CONTROL

(71) Applicant: Harbin Institute of Technology, Shenzhen, Shenzhen (CN)

(72) Inventors: Zuohua Li, Shenzhen (CN); Qinggui Wu, Shenzhen (CN); Jun Teng, Shenzhen (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 0 days.

(21) Appl. No.: 17/901,717

(22) Filed: Sep. 1, 2022

(65) Prior Publication Data
US 2023/0073232 A1     Mar. 9, 2023

(30) Foreign Application Priority Data

Jun. 30, 2022  (CN) .......................... 202210779086.7

(51) Int. Cl.
*F16F 15/00*  (2006.01)
*F16F 15/22*  (2006.01)
*F16F 15/28*  (2006.01)

(52) U.S. Cl.
CPC ............ *F16F 15/007* (2013.01); *F16F 15/22* (2013.01); *F16F 15/28* (2013.01); *F16F 2222/06* (2013.01); *F16F 2224/0283* (2013.01); *F16F 2230/18* (2013.01)

(58) Field of Classification Search
CPC .......... F16F 15/007; F16F 15/22; F16F 15/28; F16F 2222/06; F16F 2224/0283; F16F 2230/18
See application file for complete search history.

(56) References Cited

U.S. PATENT DOCUMENTS

| | | | |
|---|---|---|---|
| 2004/0226788 A1* | 11/2004 | Tanner | F16F 15/022 188/267.1 |
| 2011/0084503 A1* | 4/2011 | Li | B60G 17/019 290/1 R |
| 2021/0091296 A1* | 3/2021 | Pu | H02N 2/0075 |

FOREIGN PATENT DOCUMENTS

| | | |
|---|---|---|
| CN | 103676773 B | 4/2016 |
| CN | 112003450 A | 11/2020 |

* cited by examiner

Primary Examiner — Vishal R Sahni

(57) ABSTRACT

A highly-efficient new-energy vibration controller integrating passive, semi-active and active control, including a multi-cavity beam, a battery assembly, a wound magnetic device, a damping piezoelectric device and an inertia mass assembly. The wound magnetic device includes a connecting rod, an electromagnetic wire wound on a bottom end of the connecting rod and a magnetic box arranged at a bottom of the inertia mass assembly. A top end of the connecting rod is fixedly connected to a bottom of the multi-cavity beam. The bottom end of the connecting rod passes through a center through hole of the inertia mass assembly and arranged in the magnetic box. The magnetic box is provided with a magnetic field. The damping piezoelectric device is sleevedly arranged on an outer wall of the connecting rod. The damping piezoelectric device and the wound magnetic device are both electrically connected to the battery assembly.

10 Claims, 5 Drawing Sheets

VIBRATION CONTROL DEVICE INTEGRATING PASSIVE CONTROL, SEMI-ACTIVE CONTROL AND ACTIVE CONTROL

CROSS-REFERENCE TO RELATED APPLICATIONS

This application claims the benefit of priority from Chinese Patent Application No. 202210779086.7, filed on Jun. 30, 2022. The content of the aforementioned application, including any intervening amendments thereto, is incorporated herein by reference in its entirety.

TECHNICAL FIELD

The present disclosure relates to new energy sources and construction engineering, and more particularly to a highly-efficient new-energy vibration controller integrating passive, semi-active and active control.

BACKGROUND

Vibration dampers are classified into active vibration controllers, semi-active vibration controllers and passive vibration controllers. With respect to the active vibration controller, it has excellent control effect, but it also has strict requirements for the modeling accuracy of the controlled object. The accuracy of parameters of the controlled object, such as mass, rigidity and damping parameters, will directly affect the control effect and the control parameters, such as stroke and speed of an inertia mass block, and power of an actuator. With respect to the semi-active vibration controller, although a less external input energy is required, it fails to provide a desired control effect. The passive vibration controller does not require the external input energy, whereas, it can only control a certain mode of the controlled object, and is highly sensitive to frequency.

Regarding the exiting passive control-active control integrated vibration controller, the external energy input is still required for the traditional active vibration controller. Under extreme cases, such as earthquakes and typhoons, the exiting vibration controller will fail if the power supply is cut off. In addition, the traditional passive vibration controller is highly sensitive to frequency, and has large space occupation, complex structure and poor reliability. Furthermore, the exiting vibration controller cannot generate electrical energy in multiple channels, and has poor efficiency in converting new energy into electrical energy.

SUMMARY

In order to overcome the shortcomings of poor control effect, high frequency sensitivity, large space occupation, single function, poor reliability and low energy conversion efficiency in the prior art, the present disclosure provides a vibration controller integrating passive, semi-active and active control.

Technical solutions of this application are described as follows.

This application provides a vibration controller integrating passive, semi-active and active control, comprising:
a multi-cavity beam;
a battery assembly;
a wound magnetic device;
a damping piezoelectric device;
an inertia mass assembly; and
a magnetic box;
wherein the battery assembly is arranged inside the multi-cavity beam; two ends of the multi-cavity beam are both configured to be connected to a controlled object; the multi-cavity beam is connected to the inertia mass assembly through a steel wire rope; and the magnetic box is arranged at a bottom of the inertia mass assembly;
the wound magnetic device comprises a connecting rod and an electromagnetic wire wound around a bottom end of the connecting rod;
a top end of the connecting rod is fixedly connected to a bottom of the multi-cavity beam; the bottom end of the connecting rod passes through a center through hole of the inertia mass assembly to be arranged in the magnetic box; and the magnetic box has a magnetic field therein, and is provided with a magnetic coil configured to change the magnetic field; and
the damping piezoelectric device is sleevedly arranged at an outer wall of the connecting rod; and the damping piezoelectric device and the wound magnetic device are both electrically connected to the battery assembly.

In some embodiments, the wound magnetic device further comprises at least one wire-winding rod group on which the electromagnetic wire is wound;
wherein each of the at least one wire-winding rod group consists of two wire-winding rods arranged crosswise, and an intersection of the two wire-winding rods is located at an axis of the connecting rod.

In some embodiments, the magnetic box comprises a box body and a plurality of pairs of magnets;
the magnetic coil is arranged on the plurality of pairs of magnets; and two magnets in each pair of magnets are opposite in magnetism;
a top of the magnetic box is connected to the bottom of the inertia mass assembly; the magnetic box is provided with an accommodating cavity; and each pair of magnets is arranged opposite respectively on side walls of the box body to generate the magnetic field inside the accommodating cavity; and
the two wire-winding rods in each of the at least one wire-winding rod group on the connecting rod extend into the accommodating cavity through the center through hole; and each pair of magnets is respectively arranged at two ends of each of the two wire-winding rods in each of the at least one wire-winding rod group.

In some embodiments, the number of the at least one wire-winding rod group is one; the two wire-winding rods in one wire-winding rod group are integrally formed with the bottom end of the connecting rod; and
the box body is rectangular; and two pairs of magnets are provided.

In some embodiments, the damping piezoelectric device has a revolution structure;
the damping piezoelectric device comprises a piezoelectric ceramic inner guide cylinder and a damping rubber outer sliding cylinder; and the damping rubber outer sliding cylinder is sleevedly arranged on the piezoelectric ceramic inner guide cylinder; and
the piezoelectric ceramic inner guide cylinder is sleevedly arranged on the connecting rod; and an inner wall of the piezoelectric ceramic inner guide cylinder fits an outer wall of the connecting rod.

In some embodiments, the inertia mass assembly comprises a plurality of mass blocks stackedly arranged; and two adjacent mass blocks are detachably connected.

In some embodiments, the vibration controller further comprises a pendulum length adjusting device;

wherein the pendulum length adjusting device comprises an inner guide cylinder and an outer sliding cylinder; the outer sliding cylinder is sleevedly arranged on the inner guide cylinder; a top end of the inner guide cylinder is fixedly connected to the bottom of the multi-cavity beam; and the outer sliding cylinder is slidably connected to the inner guide cylinder;

the steel wire rope passes through the outer sliding cylinder to be connected to the bottom of the inertia mass assembly; and the outer sliding cylinder is configured to slide along the inner guide cylinder to adjust a pendulum length of the steel wire rope.

In some embodiments, the inner guide cylinder is circumferentially provided with a plurality of first adjustment hole groups; and the plurality of first adjustment hole groups are arranged around an axis of the inner guide cylinder;

each of the plurality of first adjustment hole groups comprises a plurality of first adjustment holes arranged spaced apart along a vertical direction;

the outer sliding cylinder comprises a fixing portion and a connecting portion connected to each other; the steel wire rope passes through the connecting portion; the fixing portion is circumferentially provided with a plurality of second adjustment hole groups; and the plurality of second adjustment hole groups are arranged around an axis of the outer sliding cylinder;

each of the plurality of second adjustment hole groups comprises a plurality of second adjustment holes arranged spaced apart along the vertical direction; and the fixing portion is configured to slide along the inner guide cylinder; and each of the plurality of first adjustment holes is boltedly connected with a corresponding second adjustment hole.

In some embodiments, the battery assembly comprises a plurality of battery cells connected in series.

In some embodiments, the multi-cavity beam is provided with a plurality of cavities; and the plurality of battery cells are respectively placed in the plurality of cavities.

Compared to the prior art, this application has the following beneficial effects.

Regarding the vibration controller designed herein, due to the provision of the battery assembly, the wound magnetic device and the inertia mass assembly, when the inertia mass assembly receives a small external load under the response of the controlled object, and the electromagnetic wire of the wound magnetic device and the magnetic coil of the magnetic box both are powered off, the inertia mass assembly swings to drive the magnetic box arranged at the bottom of the inertial mass assembly to swing to arrive at the passive control. When the magnetic coil of the magnetic box is energized, and the electromagnetic wire of the wound magnetic device is de-energized, the intensity of the magnetic field inside the magnetic box can be adjusted, such that the damping parameter can be dynamically adjusted to achieve the semi-active control. In the case of a rare condition, the magnetic coil and the electromagnetic wire both are energized, and the wound magnetic device drives the magnetic box to move to allow the inertia mass assembly connected thereto to reciprocate, thereby completing the active control. In order to ensure the reliability when the external power supply is cut off under overload conditions, the operation mode of the vibration controller can be switched between active control, semi-active control and passive control in sequence. After the active control has been performed under the power-on state for a period of time, due to the electrical energy consumption, the operation mode is switched to the semi-active control. When the electrical energy is completely consumed, the operation mode is automatically switched to the passive control.

Under the passive control, a relative displacement is produced between the magnetic field in the magnetic box and the electromagnetic wire, that is, the magnetic field in the magnetic box cuts the electromagnetic wire to generate electrical energy. The electrical energy is stored in the battery assembly through the wound magnetic device. In addition, when the electromagnetic wire is cut, a certain resistance will be generated to suppress the swing of the inertial mass assembly. In this case, when the external power supply is unavailable, the battery assembly can supply power to the electromagnetic wire and the magnetic coil, improving the reliability.

Furthermore, the damping piezoelectric device not only provides damping performance, but also can convert the energy of an external excitation load acting on the controlled object into electrical energy, enhancing the energy utilization. The vibration controller provided herein has strong vibration suppressing performance, high reliability, high energy utilization and wide application.

Figure 1:
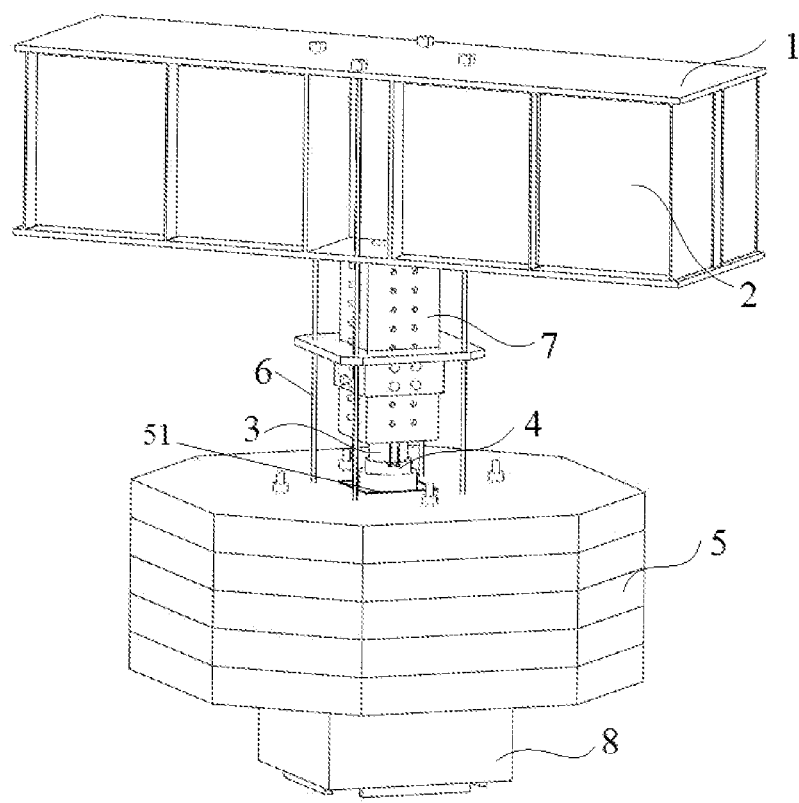
FIG. 1 is a structural diagram of a vibration controller integrating passive, semi-active and active according to an embodiment of the present disclosure.

In the drawings: 1, multi-cavity beam; 2, battery assembly; 3, wound magnetic device; 31, connecting rod; 32, electromagnetic wire; 33, wire-winding rod; 4, damping piezoelectric device; 41, piezoelectric ceramic inner guide cylinder; 42, damping rubber outer sliding cylinder; 5, inertia mass assembly; 51, center through hole; 6, steel wire rope; 7, pendulum length adjusting device; 71, inner guide cylinder; 711, first adjustment hole; 72, outer sliding cylinder; 721, fixing portion; 7211, second adjustment hole; 722, connecting portion; 8, magnetic box; 81, box body; 82, magnet; and 83, magnetic coil.

DETAILED DESCRIPTION OF EMBODIMENTS

Technical solutions of the present disclosure will be described in detail below with reference to the accompany drawings and embodiments to facilitate the understanding. It should be understood that described below are merely some embodiments of the present disclosure, which are not intended to limit the disclosure.

Figure 2:
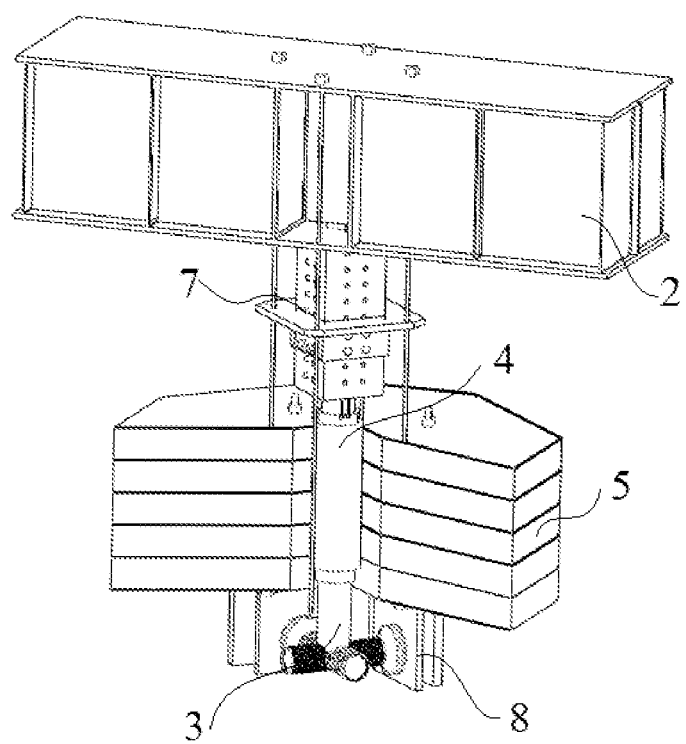
FIG. 2 is a sectional view of an inertia mass assembly and a magnetic box of the vibration controller according to an embodiment of the present disclosure.

Referring to an embodiment illustrated in FIGS. 1-2, a vibration controller integrating passive, semi-active and active control includes a multi-cavity beam 1, a battery assembly 2, a wound magnetic device 3, a damping piezoelectric device 4, an inertia mass assembly 5, a magnetic box 8 and a pendulum length adjusting device 7. The wound magnetic device 3 and the damping piezoelectric device 4 both are connected to an external power supply.

As shown in FIGS. 1-2, the battery assembly 2 is arranged inside the multi-cavity beam 1. Two ends of the multi-cavity beam 1 are both connected to a controlled object. A bottom of the multi-cavity beam 1 is connected to the inertia mass assembly 5 through a steel wire rope 6. The magnetic box 8 is arranged at a bottom of the inertia mass assembly 5. The multi-cavity beam 1 is an I-shaped beam with holes made thereon. The steel wire rope 6 is connected to the multi-cavity beam 1 through the opening hole of the multi-cavity beam 1. The size and shape of the holes are determined according to the actual stress. The multi-cavity beam 1 is connected to the controlled object or shear wall by means of a bolt or a pre-buried part, where the controlled object is a component requiring vibration control, such as building component, towering wind power component and marine fan component. The steel wire rope 6 can include one or more steel wire ropes, and the diameter and strength of the steel wire rope 6 is determined by the actual stress.

Figure 3:
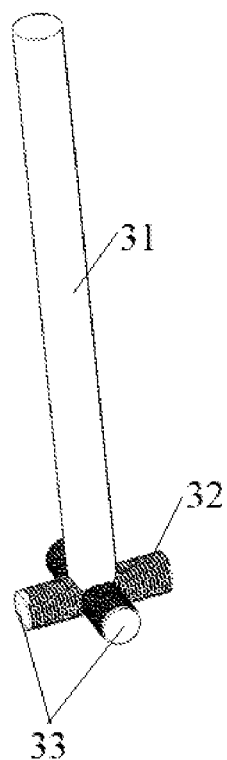
FIG. 3 is a structural diagram of a wound magnetic device according to an embodiment of the present disclosure.

As shown in FIG. 3, the wound magnetic device 3 includes a connecting rod 31, at least one wire-winding rod group and an electromagnetic wire 32 winding on the least one wire-winding rod group. Each of the at least one wire-winding rod group consists of two wire-winding rods 33 arranged crosswise, and an intersection of the two wire-winding rods 33 is located at an axis of the connecting rod. A top end of the connecting rod 31 is fixedly connected to the bottom of the multi-cavity beam 1. A bottom end of the connecting rod 31 passes through a center through hole 51 of the inertia mass assembly 5 to be arranged in the magnetic box 8. The magnetic box 8 has a magnetic field therein, and is provided with a magnetic coil 81 configured to change the magnetic field. The connecting rod 31 and the two wire-winding rods 33 are integrally formed by using high strength steel.

As shown in FIG. 2, the damping piezoelectric device 4 is sleevedly arranged at an outer wall of the connecting rod 31. The damping piezoelectric device 4 and the wound magnetic device 3 are both electrically connected to the battery assembly 2. During use, the vibration controller further includes a controller. The controller can adjust a current input into the wound magnetic device 3 by the battery assembly 2, so as to adjust a motion range of the inertia mass assembly 5. The battery assembly 2 includes multiple battery cells connected in series. The multi-cavity beam 1 is provided with multiple cavities. The battery cells are respectively placed in the cavities.

In an embodiment, for easy processing and installation, the inertia mass assembly 5 includes multiple mass blocks stackedly arranged. The multiple mass blocks are connected to each other through a bolt, i.e., two adjacent mass blocks are detachably connected, facilitating to increase or decrease a weight of the inertial mass assembly to satisfy the required control effect. A center of each of the mass blocks is provided with an opening. The mass blocks are connected, such that the openings of the mass blocks form the center through hole 51. A size of the center through hole 51 is determined by the stroke of the mass blocks. In an embodiment, the center through hole 51 is square.

Figure 5:
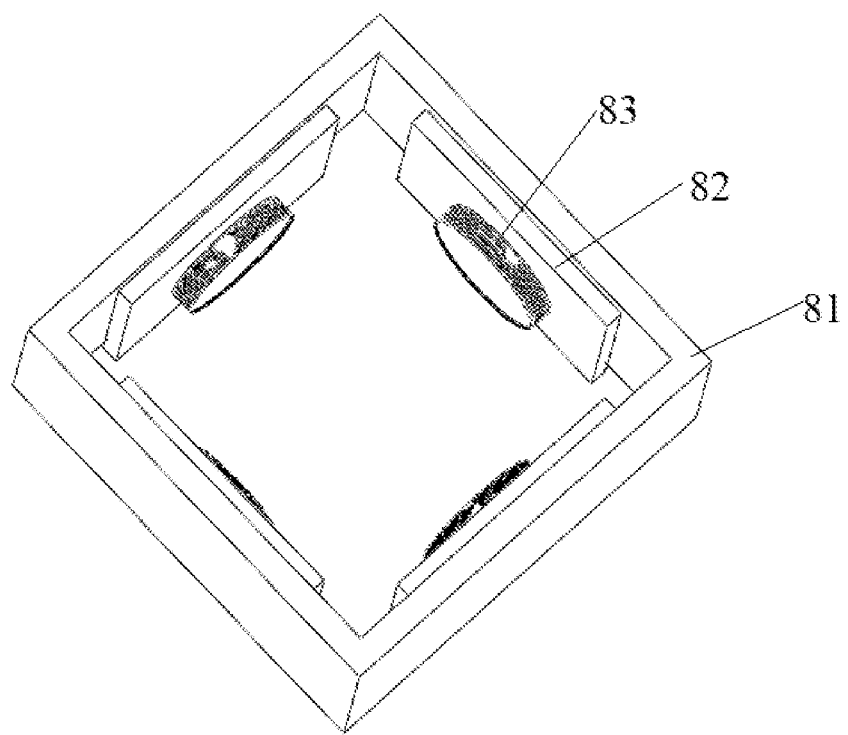
FIG. 5 is a structural diagram of a box body of the magnetic box according to an embodiment of the present disclosure.

As shown in FIG. 5, the magnetic box 8 includes a box body 81 and multiple pairs of magnets 82. The magnetic coil 83 is arranged on the magnets 82 to change a current of the magnetic coil 83. In consequence, an intensity of the magnetic field inside the magnetic box 8 can be adjusted, and a damping parameter can be thus dynamically adjusted. Each pair of the magnets 82 are opposite in magnetism. A top of the magnetic box 8 is connected to a bottom of the inertia mass assembly 5. The magnetic box 8 is provided with an accommodating cavity. Each pair of magnets 82 is arranged opposite respectively on side walls of the box body 81 to generate the magnetic field inside the accommodating cavity. The two wire-winding rods 33 on the connecting rod 31 extend into the accommodating cavity through the center through hole 51. Each pair of the magnets 82 is respectively arranged at two ends of each wire-winding rod 33. In an embodiment, the vibration controller includes two wire-winding rods 33. The two wire-winding rods 33 are integrally formed with the bottom end of the connecting rod 31. The box body 81 is rectangular. Two pairs of magnetic substances 82 are arranged inside the accommodating cavity, and each pair of magnetic substances 82 is arranged opposite.

In an embodiment, the magnetic box 8 includes multiple magnetic coils 83. Each magnet 82 is provided with one magnetic coil 83 configured to adjust distribution of the intensity of the magnetic field, such that a damping can be dynamically adjusted, and a swing of the inertial mass assembly 5 can be controlled better.

Figure 4:
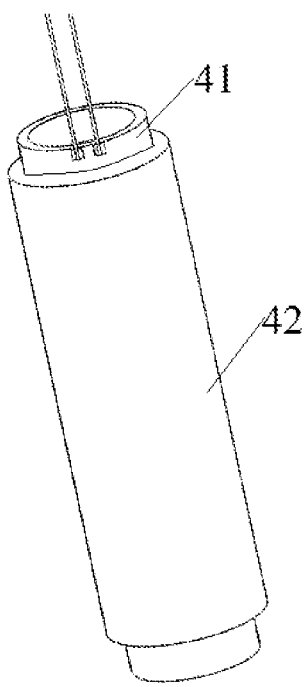
FIG. 4 is a structural diagram of a damping piezoelectric device according to an embodiment of the present disclosure.

As shown in FIG. 4, the damping piezoelectric device 4 has a revolution structure. The damping piezoelectric device 4 includes a piezoelectric ceramic inner guide cylinder 41 and a damping rubber outer sliding cylinder 42. The damping rubber outer sliding cylinder 42 is sleevedly arranged on the piezoelectric ceramic inner guide cylinder 41. An inner wall of the damping rubber outer sliding cylinder 42 bondedly fits an outer wall of the damping rubber outer sliding cylinder 42. The piezoelectric ceramic inner guide cylinder 41 is sleevedly arranged on the connecting rod 31. An inner wall of the piezoelectric ceramic inner guide cylinder 41 fits an outer wall of the connecting rod 31. The piezoelectric ceramic inner guide cylinder 41 is connected to one end a power transmission line. The other end of the power transmission line is connected to the battery cells. The damping piezoelectric device 4 not only provides damping performance, but also can convert the energy of an external excitation load acting on the controlled object into electrical energy to be stored in the battery assembly 2, so as to provide electrical energy for an active control mode. The damping rubber outer sliding cylinder 42 of the damping piezoelectric device 4 can limit the travel of the mass blocks to prevent the inertia mass assembly from colliding with the controlled object, thus ensuring safe operation, and improving reliability.

Since both the damping piezoelectric device 4 and the wound magnetic device 3 can convert energy into electrical energy to be stored in the battery assembly 2, they can supply power to other appliances in addition to the vibration controller provided herein, improving the reliability and energy utilization.

Figure 6:
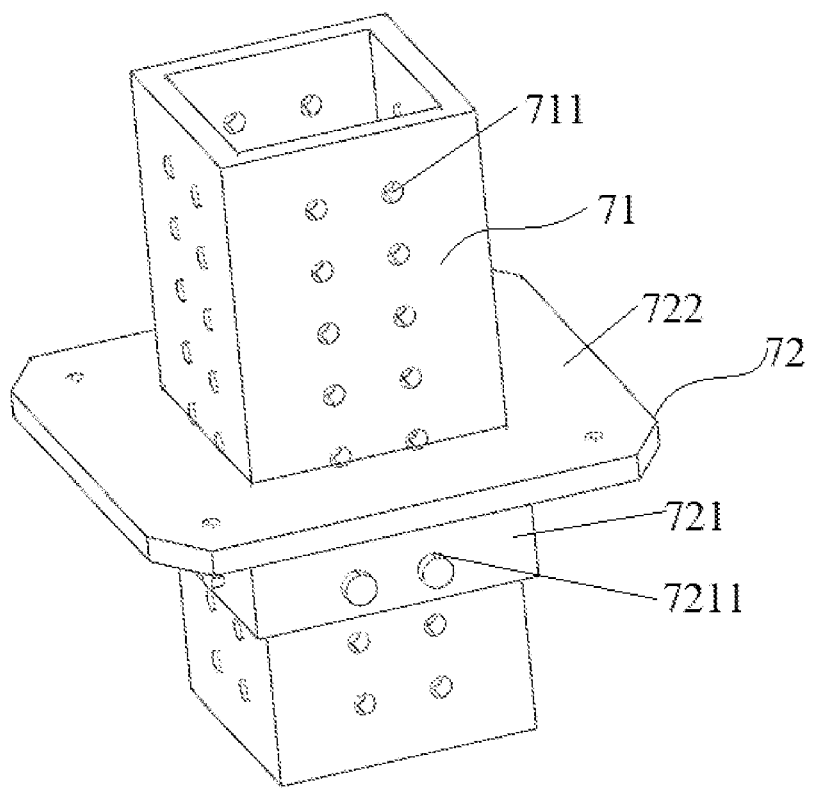
FIG. 6 is a structural diagram of a pendulum length adjusting device according to an embodiment of the present disclosure.

As shown in FIG. 6, the pendulum length adjusting device 7 is configured to control a pendulum length of the steel wire rope 6, so as to adjust a pendulum period of the vibration controller provided herein. The pendulum length adjusting device 7 includes an inner guide cylinder 71 and an outer sliding cylinder. The outer sliding cylinder 72 is sleevedly arranged on the inner guide cylinder 71. A top end of the inner guide cylinder 71 is fixedly connected to the bottom of the multi-cavity beam 1. The outer sliding cylinder 72 is slidably connected to the inner guide cylinder 71. The steel wire rope 6 passes through the outer sliding cylinder 72 to be connected to the bottom of the inertia mass assembly 5. The outer sliding cylinder 72 can slide along the inner guide cylinder to adjust the pendulum length of the steel wire rope 6.

Specifically, the inner guide cylinder 71 is circumferentially provided with multiple first adjustment hole groups. The first adjustment hole groups are arranged around an axis of the inner guide cylinder 71. Each of the first adjustment hole groups includes multiple first adjustment holes 711 arranged spaced apart along a vertical direction. The outer sliding cylinder 72 includes a fixing portion 721 and a connecting portion 722 connected to each other. The steel wire rope 6 passes through the connecting portion 722. The fixing portion 721 is circumferentially provided with multiple second adjustment hole groups. The multiple second adjustment hole groups are arranged around an axis of the outer sliding cylinder 72. Each of the second adjustment hole groups includes multiple second adjustment holes 7211 arranged spaced apart along the vertical direction. The fixing portion 721 can slide along the inner guide cylinder 71. Each of the first adjustment holes 711 is boltedly connected with a corresponding second adjustment holes 7211. The first adjustment holes 711 and the second adjustment holes 7211 are both threaded holes. Since the outer sliding cylinder 72 can slide and is fixed by the bolt, the pendulum length of the steel wire rope 6 is adjusted. The pendulum length of the steel wire rope 6 can be calculated according to a control frequency of the controlled object.

If the pendulum length is out of a desired frequency range, the wire-winding rods 33 are provided with a spring (not showing in drawings). One end of the spring is connected to an end of a wire-winding rod 33, and the other end of the spring is connected to the magnetic substance 82 to develop a rigidity of the vibration controller, such that the pendulum length is limited within the desired frequency range.

When the controlled object is a flexible larger structure or equipment, such as super high-rise, TV tower and wind turbine, since the pendulum period is too large and the pendulum length is too long, a connection part of the steel wire rope 6 and the multi-cavity beam 1 is slidably arranged along a long axis of the multi-cavity beam 1, and a hole on the outer sliding cylinder is rectangular. Meanwhile, a small rigidity of the spring can significantly reduce a length of the steel wire rope 6, so as to reduce a vertical space occupation.

Regarding the vibration controller designed herein, due to the provision of the battery assembly 2, the wound magnetic device 3, the inertia mass assembly 5 and the pendulum length adjusting device 7, when the inertia mass assembly 5 receives a small external load under the response of the controlled object, and the electromagnetic wire 32 of the wound magnetic device 3 and the magnetic coil 83 of the magnetic box 8 both are powered off, the inertia mass assembly 5 swings to drive the magnetic box 8 arranged at the bottom of the inertial mass assembly 5 to swing to arrive at the passive control. When the magnetic coil 83 of the magnetic box 8 is energized, and the electromagnetic wire 32 of the wound magnetic device 3 is de-energized, the intensity of the magnetic field inside the magnetic box 8 can be adjusted, such that the damping parameter can be dynamically adjusted to achieve the semi-active control. In the case of a rare condition, the magnetic coil 83 and the electromagnetic wire 32 both are energized, and the wound magnetic device 3 drives the magnetic box 8 to move to allow the inertia mass assembly 5 connecting thereto to reciprocate, thereby completing the active control. In order to ensure the reliability when the external power supply is cut off under overload conditions, the operation mode of the vibration controller can be switched between active control, semi-active control and passive control in sequence. After the active control has been performed under the power-on state for a period of time, due to the electrical energy consumption, the operation mode is switched to the semi-active control. When the electrical energy is completely consumed, the operation mode is automatically switched to the passive control.

Under the passive control, a relative displacement is produced between the magnetic field in the magnetic box 8 and the electromagnetic wire 32, that is, the magnetic field in the magnetic box 8 cuts the electromagnetic wire 32 to generate electrical energy. The electrical energy is stored in the battery assembly 2 through the wound magnetic device 3. In addition, when the electromagnetic wire 32 is cut, a certain resistance will be generated to suppress the swing of the inertial mass assembly 5. In this case, when the external power supply is unavailable, the battery assembly 2 can supply power to the electromagnetic wire 32 and the magnetic coil 83, improving the reliability.

Furthermore, when the inertia mass assembly 5 collides with the damping piezoelectric device 4 arranged at the wound magnetic device 3, the damping piezoelectric device 4 not only limits the inertia mass assembly 5 to prevent it from colliding with the controlled structure to ensure the security, but also converts an external excitation load acting on the controlled object into electrical energy. When the wire-wound magnetic device 3 cutting the magnetic field to generate electricity, an excess kinetic energy of the inertial mass assembly 5 is converted into electricity by striking the piezoelectric ceramic inner guide cylinder 41, so as to generate electrical energy in multiple channels, thereby increasing the energy utilization.

Considering different conditions, different controls can be combined to improve a vibration control effect compared to the traditional vibration controller. For example, when the external excitation is rare typhoons or earthquakes, and a town where the controlled object is located is in power cut or a power line of the controlled object is damaged, the active control with higher control efficiency can be selected firstly. When the electrical energy of the battery assembly 2 is difficult to drive the inertia mass assembly 5 to move after the battery assembly 2 performs a while under the active control, the semi-active control can be selected. When the electrical energy is completely consumed, the passive control requiring no electrical energy input can be selected. In consequence, an ability of the controlled object under rare external excitation is ensured, especially the controlled object that plays an important role in society, such as TV towers, hospitals, primary and secondary schools and nuclear power plants and other important buildings and equipment that guarantee the lifeline, a control effect of the vibration controller is significantly improved.

When multiple vibration controllers are arranged in vertical direction and horizontal direction along the controlled object, and the different effective pendulum lengths are set to control each order modal of the controlled object, respectively, thereby significantly reducing the cost and production difficulty of the vibration controller, avoid a modal cycle sensitive and improving vibration control effect in passive control.

In summary, the vibration controller provided herein can generate electric energy in multiple channels, with high conversion rate of new energy, strong ability to suppress vibration, high reliability, high operational safety and wide application.

It should be noted that terms "first" and "second" used herein are illustrative, and not to indicate or imply the relative importance or implicitly specify the number of technical features. Elements defined with "first" and "second" may explicitly or implicitly include at least one of the element. Unless otherwise specified, term "plurality of" should be understood as including two or more than two.

Unless otherwise specified, terms "arrange", "connect", "communicate", "fix" and so on should be understood in a broad sense, such as fixed connection, removable connection, or integrative connection; mechanical connection, electrical connection, or communication; direct connection, or indirect connection through an intermediate medium; or connection within two components or an interaction relationship between two components.

Unless otherwise specified, a first element is "above" or "below" a second element means that the first element directly or indirectly contacts the second element. Terms "above", "on", "upper" directly above, diagonally above or horizontally higher. Terms "below", "down", "under" means directly below, diagonally below or horizontally lower.

Terms "an embodiment", "some embodiments", "example", "specific example" and "some examples" means that the specific features, structures, materials, or characteristics described in connection with the embodiment or example are included in at least one embodiment or example of the present application. The above terms do not have to be directed to the same embodiments or examples. Moreover, the specific features, structures, materials, or characteristics described may be combined in a suitable manner in any one or more embodiments or examples. The features of various implementing embodiments may be combined to form further embodiments of the disclosed concepts.

Described above are merely illustrative of the disclosure, and are not intended to limit the disclosure. Although the disclosure has been illustrated and described in detail above, it should be understood that those skilled in the art could still make modifications and changes to the embodiments of the disclosure. Those modifications, changes, replacements and variations made by those skilled in the art based on the content disclosed herein without departing from the scope of the disclosure shall fall within the scope of the present disclosure defined by the appended claims.

What is claimed is:

1. A vibration controller integrating passive, semi-active and active control, comprising:
   a multi-cavity beam;
   a battery assembly;
   a wound magnetic device;
   a damping piezoelectric device;
   an inertia mass assembly; and
   a magnetic box;
   wherein the battery assembly is arranged inside the multi-cavity beam; two ends of the multi-cavity beam are both configured to be connected to a controlled object; the multi-cavity beam is connected to the inertia mass assembly through a steel wire rope; and the magnetic box is arranged at a bottom of the inertia mass assembly;
   the wound magnetic device comprises a connecting rod and an electromagnetic wire wound around a bottom end of the connecting rod;
   a top end of the connecting rod is fixedly connected to a bottom of the multi-cavity beam; the bottom end of the connecting rod passes through a center through hole of the inertia mass assembly to be arranged in the magnetic box; and the magnetic box has a magnetic field therein, and is provided with a magnetic coil configured to change the magnetic field; and
   the damping piezoelectric device is sleevedly arranged at an outer wall of the connecting rod; and the damping piezoelectric device and the wound magnetic device are both electrically connected to the battery assembly.

2. The vibration controller of claim 1, wherein the wound magnetic device further comprises:
   at least one wire-winding rod group on which the electromagnetic wire is wound;
   wherein each of the at least one wire-winding rod group consists of two wire-winding rods arranged crosswise, and an intersection of the two wire-winding rods is located at an axis of the connecting rod.

3. The vibration controller of claim 2, wherein the magnetic box comprises a box body and a plurality of pairs of magnets;
   the magnetic coil is arranged on the plurality of pairs of magnets; and two magnets in each pair of magnets are opposite in magnetism;
   a top of the magnetic box is connected to the bottom of the inertia mass assembly; the magnetic box is provided with an accommodating cavity; and each pair of magnets is arranged opposite respectively on side walls of the box body to generate the magnetic field inside the accommodating cavity; and
   the two wire-winding rods in each of the at least one wire-winding rod group on the connecting rod extend into the accommodating cavity through the center through hole; and each pair of magnets is respectively arranged at two ends of each of the two wire-winding rods in each of the at least one wire-winding rod group.

4. The vibration controller of claim 3, wherein the number of the at least one wire-winding rod group is one; the two wire-winding rods in one wire-winding rod group are integrally formed with the bottom end of the connecting rod; and
   the box body is rectangular; and two pairs of magnets are provided.

5. The vibration controller of claim 1, wherein the damping piezoelectric device has a revolution structure;
   the damping piezoelectric device comprises a piezoelectric ceramic inner guide cylinder and a damping rubber outer sliding cylinder; and the damping rubber outer sliding cylinder is sleevedly arranged on the piezoelectric ceramic inner guide cylinder; and
   the piezoelectric ceramic inner guide cylinder is sleevedly arranged on the connecting rod; and an inner wall of the piezoelectric ceramic inner guide cylinder fits an outer wall of the connecting rod.

6. The vibration controller of claim 1, wherein the inertia mass assembly comprises a plurality of mass blocks stackedly arranged; and two adjacent mass blocks are detachably connected.

7. The vibration controller of claim 1, further comprising:
   a pendulum length adjusting device;
   wherein the pendulum length adjusting device comprises an inner guide cylinder and an outer sliding cylinder; the outer sliding cylinder is sleevedly arranged on the inner guide cylinder; a top end of the inner guide cylinder is fixedly connected to the bottom of the multi-cavity beam; and the outer sliding cylinder is slidably connected to the inner guide cylinder;
   the steel wire rope passes through the outer sliding cylinder to be connected to the bottom of the inertia mass assembly; and the outer sliding cylinder is configured to slide along the inner guide cylinder to adjust a pendulum length of the steel wire rope.

8. The vibration controller of claim 7, wherein the inner guide cylinder is circumferentially provided with a plurality of first adjustment hole groups; and the plurality of first adjustment hole groups are arranged around an axis of the inner guide cylinder;

each of the plurality of first adjustment hole groups comprises a plurality of first adjustment holes arranged spaced apart along a vertical direction;

the outer sliding cylinder comprises a fixing portion and a connecting portion connected to each other; the steel wire rope passes through the connecting portion; the fixing portion is circumferentially provided with a plurality of second adjustment hole groups; and the plurality of second adjustment hole groups are arranged around an axis of the outer sliding cylinder;

each of the plurality of second adjustment hole groups comprises a plurality of second adjustment holes arranged spaced apart along the vertical direction; and the fixing portion is configured to slide along the inner guide cylinder; and each of the plurality of first adjustment holes is boltedly connected with a corresponding second adjustment hole.

9. The vibration controller of claim 1, wherein the battery assembly comprises a plurality of battery cells connected in series.

10. The vibration controller of claim 9, wherein the multi-cavity beam is provided with a plurality of cavities; and the plurality of battery cells are respectively placed in the plurality of cavities.

* * * * *